United States Patent Office 2,831,218
Patented Apr. 22, 1958

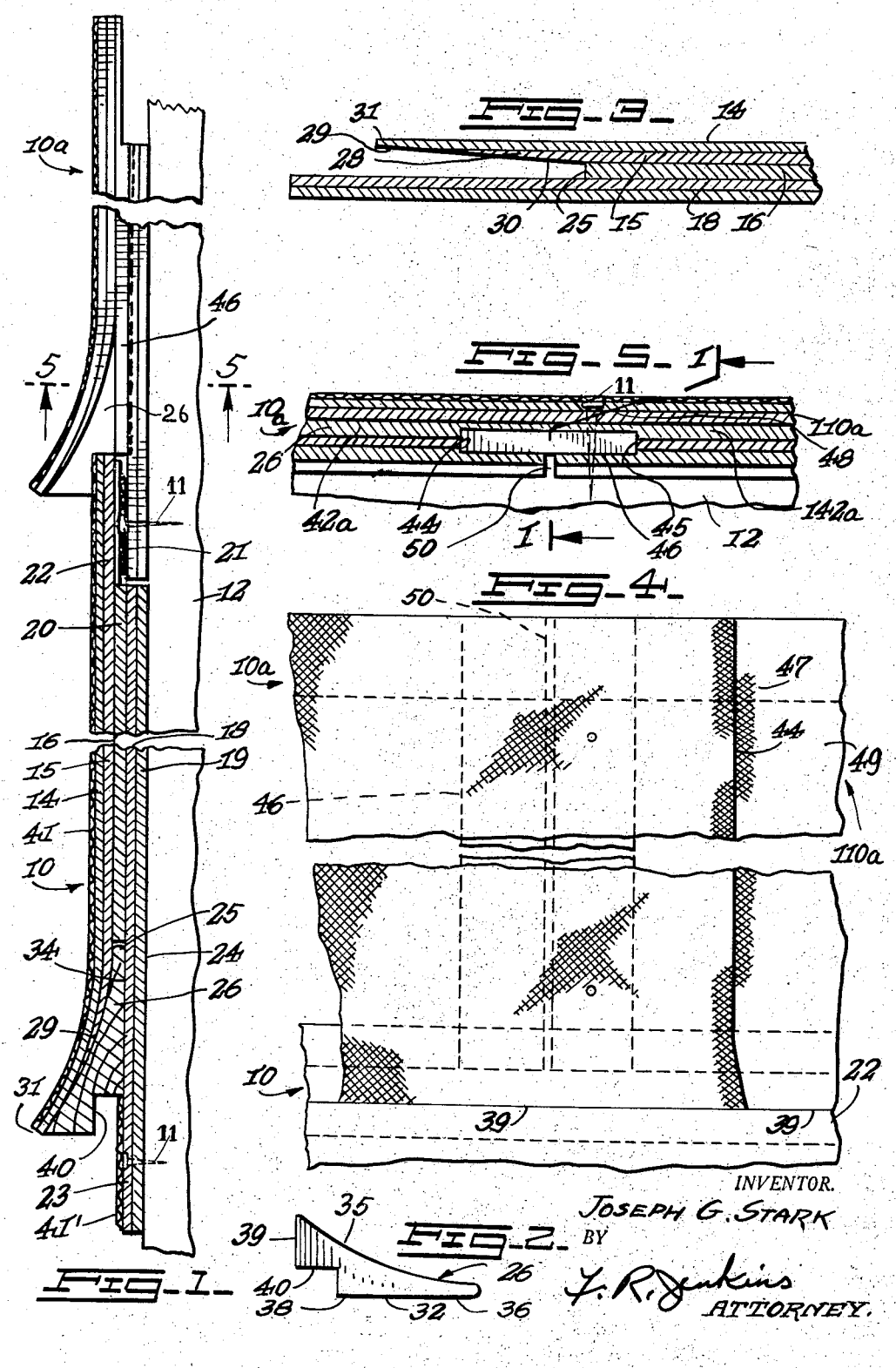

2,831,218

LAMINATED COVERING BOARD WITH LAP-WEDGE

Joseph George Stark, Bronx, N. Y., assignor, by mesne assignments, to Lanteck Corporation of America, Irvington, N. Y.

Application October 19, 1955, Serial No. 541,434

5 Claims. (Cl. 20—5)

The invention relates to board joints and more particularly to joints particularly suitable for laminated boards.

In building construction the use of laminated board for exteriors has been extensively used for temporary structures which have proved to be strong and generally have shown surprisingly good resistance to weathering.

Laminated board is available in such strengths that it may serve the dual purpose of side sheeting and weather boarding or other exterior covering, thereby eliminating substantially all the weight of the weather boarding and the need for separately applying two side coverings. The same can be said for roofing.

In spite of the advantages of laminated board it has not been well received for dwelling-house construction. This has been due in large part to undesirably appearing joints between the boards when the latter are joined to give maximum strength, especially at horizontal joints. The joints have heretofore usually been filled with caulking compounds which tend to run or have been covered by strips so long associated in the mind with mounting of paper-board ceilings that the house does not have a substantial appearance.

In some instances the laminated boards have been lapped, as ordinary clapboards, but this type of mounting is much weaker than the coplanar mounting where nails need have strength only against shear, and where edge-to-edge mounting is possible. Simple laps employing a tongue and rabbet groove have been suggested, but even these do not afford a "shadow line" and appear as marked streaks on a flat surface.

An object of the invention is to convert ordinary board of uniform thickness to a form giving a shadow line with minimum alteration of the board.

Another object is to enable the use of laminated board for the exterior of structures that will afford maximum strength and appear as traditional exterior coverings.

Another object is to provide waterproof joints in exterior boarding.

The attainment of these and other objects is reached in a board according to my invention which briefly stated includes a laminated board having a longitudinal groove in one edge thereof and adjacent a ply of the board having grain running in the direction of the groove. A wedge strip is secured in the groove and so shaped as to curl the grained ply and increase the effective thickness of the board at said edge. The wedge strip is provided with a rabbet groove to receive a tongue on the correspondingly opposite edge of an adjacent board.

In the accompanying drawing showing, by way of example, one of many possible embodiments of the invention, Fig. 1 shows one board in transverse vertical section and one end of a second similar board mounted thereabove, the section being taken substantially along the broken line 1—1 of Fig. 5, looking in the direction of the arrows of said line;

Fig. 2 is an end view of the wedge strip;

Fig. 3 shows a stage in forming the board from commercial stock;

Fig. 4 is a front view showing a third similar board mounted on the first board at an end of the second and, Fig. 5 is a sectional view showing the juncture of the second and third boards, the section being taken substantially along the line 5—5 of Fig. 1, looking in the direction of the arrows of said line.

The invention is shown in connection with a pair of edge-to-edge adjacent covering boards 10 and 10a both substantially alike and secured by nails as at 11 to a structure frame-member 12 which may be a stud, rafter or the like.

As shown, the boards are formed from five-ply stock having outermost, middle, and base plies 14, 16 and 19 respectively, all with their grain running in the same direction which is normally longitudinal to the boards, since it is contemplated that the use of the boards will frequently dictate that the boards have greater length than breadth. The grain of the remaining plies 15 and 18 (respectively intermediate plies 14 and 16 and plies 16 and 19) is transverse to that of plies 14, 16 and 19 in the usual manner. To avoid confusion the ply 15 will be referred to as an outer ply, and ply 18 an inner ply.

The upper marginal portion 20 of the board 10 is provided with a rabbet groove 21 so as to provide a tongue 22 including the outermost and outer plies and a portion of the middle ply. The tongue extends substantially the entire length of the board.

The lower marginal portion 24 of the board is provided with a depending lap portion 23 extending the length of the board, which includes the inner and base plies. The middle ply 16 or the major thickness thereof terminates in a line short of the lap portion in a position as at 25 so that a thickening wedge strip 26 may be wedged between the inner ply 18 and the plies 14 and 15.

If ordinary plywood is used, a portion of the middle ply is cut out by sawing a deep slot or groove to the depth at 25. In order to prevent splitting of the plywood board by the strip 26, the marginal portion 28 of the outer layer 15 becomes thinner the more remote it is from the zone at 25. Again this may be accomplished by slightly tilting the saw used to cut the mentioned slot, so that the inner ply tapers to a feather edge as at 29 (Fig. 3) where it is on the inner surface 30 of the outermost ply 14. The thickness of the outermost ply may also taper due to the same second sawing but does not, preferably, taper to a feather edge. The outermost ply is cut off short of the edge of the lap member so that it has thickness nearly as great at the edge 31 as in the body of the board.

The tapered margin 28 extends along the length of the board and it runs across the grain of the ply 15. The taper not only affords the wedge strip greater room but permits greater displacement of edge 31, by bending, to a progressively greater extent from the zone at 25 toward the feather edge. The outer ply 15 is inherently more resistant to bending by the edge strip than is the outermost ply since the grain filaments of the former must be bent while those of the latter may remain substantially straight.

The wedge strip 26 has a substantially flat base surface 32 for engaging on the outer surface 34 of the inner ply 18 or of the lap member 25 since the lap member may include a slight portion of the middle ply. The opposite engagement surface 35 is more concave than flat and approaches being parallel with the base surface at the thinner portion 36, the latter having minimum thickness about equal to the thickness of the middle ply 16. The two engagement faces flare at increasing rates from the portion 36 to the thicker edge portion 38, the latter having a "shadow line" edge 39 and an undercut rabbet groove 40 for receiving the tongue 22 of an adjacent board. The edge 31 of the outermost ply terminates substantially at the shadow line edge.

The wedge strip 26 is adhered in position to the plies 14, 15 and 18 with its thinner portion 36 approximately at zone 25. The outermost ply will stand considerable curling for somewhat the same reason that a slatted shade may be rolled up. While proportions are not critical, a wedge strip about 1¾ inches wide with maximum and minimum thickness of 9/16 inch and ⅛ inch respectively produces a good lap joint on boards having ⅛ inch plies. The thickness of the outermost ply at edge 31 was about 3/32 inch. It has been found that when ordinary commercial plywood is used that it is preferable that the combined thickness of plies 14 and 15 at zone 25 be slightly less than that of plies 18 and 19 lest the latter plies be bent out of alinement with the body of the board.

When especially adverse weather conditions are to be expected, it is desirable to cover the lap portion 23, on which the tongue 22 of an adjoining board engages, with spun glass cloth 41 secured thereon with readily setting resin such as catalyzed epoxy resins, well known. If this is done the rabbet groove 21 should be so proportioned that the tongue will fit snugly in the groove 40 under the strip and the boards 10, 10a be coplanar at the base ply. If the cloth is omitted, the dimension should be such that the several respective plies are coplanar after nails 11 are driven.

The glass cloth can likewise be used with advantage over the entire exposed surface of the board from the edge 31 at the shadow line to adjoin board as at 41. The tensile strength of the glass cloth is so great that it does not allow the exposed ply to split.

Presumably volume changes due to variations in humidity and temperature are confined to thickness changes in the exposed surface portions. If the exposed surface is constrained against splitting for a depth of only a few thousandths of an inch, there is substantially no tendency for the interior to split.

If the boards are to be used as siding they may usually have their ends squared off for a butt fit against each other. However if the boards are to be used for roofing the ends may require a joint such as shown in Figs. 4 and 5 wherein two upper boards 10a and 110a are joined end-to-end to each other and laterally to the lower board 10.

The end portions 42a and 142a of the respective boards are provided with transverse end grooves 44 and 45 respectively in the region of their respective middle plies (and passing through the respective wedge strips), starting at the respective rabbet grooves 40 and extending transversely the width of the board. A tongue strip 46 is disposed snugly in these grooves to hold the boards coplanar. The outer regions of the end portions 42a and 142a, that is to say, the regions exterior of the tongue strip, terminate in a plane leaning in the direction of the length of the board, as shown by the line 48, the plane intersecting the tongue strip at the mid portion and the outermost ply at a narrow crack line 49 over which glass cloth may be adhered as at 47. The adhesive may be a polyvinyl ester, epoxy resin or the like which also serves to make the joint weatherproof, and of course it may be present along the plane of the joint. The two boards preferably do not abut each other tightly at the regions inner of the tongue strip but are slightly spaced as at 50 to leave a breather space to allow the escape of vapor from any moisture that may collect in the materials.

The inner, outer and middle plies may be consolidated into one ply if composition board of sufficient strength and having no grain is used to replace the three plies. Under such conditions the base ply may be omitted. However, such conditions usually necessitate a thinner taper portion 28 and a thicker lap portion 23, to prevent bending the lap portion out of the plane of the board as a whole.

For the use as shown, wherein the nails 11 are not exposed, the order of laying the boards, planks, sheets or panels is progressively downward with, of course, an upward motion to insert the tongue 22 in the groove 40.

While I have referred to the members 10, 10a, and 110 as boards such a term is used in a general sense and the invention is not confined to member-proportions commonly associated with one such word as plank, board, panel or sheet since the invention does not involve lengths and widths. Accordingly these terms may be used substantially synonymously. Accordingly a sheet or board may have greater breadth than length.

While I have mentioned the use of the sheets of the invention as a roofing material it is obvious that the dimenions may be chosen to more nearly simulate conventional shingles. Also the sheets whether used for roofing or siding may be decorated, preferably by embossing, to simulate shingles or other appropriately appearing coverings.

I claim as my invention:

1. A plank-like sheet or panel comprising a board having an exterior wooden portion with grain, an edge portion of the board being provided with a slot between the faces of the board, one wall of the slot being parallel with said faces; and a strip wedge secured in the slot and running the length of the board, the wedge having a flat engagement face secured to said wall and a substantially opposed engagement face having a curved surface engaging the opposite wall of the slot the thickness of the wedge increasing at a progressively greater rate toward the edges of the slot to curl the wood at the marginal portion of said exterior portion and increase the effective thickness of the board, said wedge being provided with a rabbet groove having a face terminating at said wall.

2. A sheet or panel comprising a board of plywood having exposed outermost and base plies the outermost ply having grain in the direction of the length of the board, one edge marginal portion of the board having a part including the base ply; said part having inner and outer faces parallel with the general plane of the board, and a strip wedge running with the board to flare the edge marginal portion of the outermost ply from the planes of the part, and having a flat engagement face secured to the board in the plane of said outer face and a substantially opposed curved engagement face secured to the outermost ply the wedge having a thick edge portion to form a shadow line, the wedge thickness between said engagement faces increasing at a progressively greater rate toward the edge of said outermost ply, said wedge being provided with a rabbet groove having a face terminating at the outer face of the part.

3. A plank-like sheet comprising a board of plywood having exposed outermost and base plies and an intermediate ply, the grain of the outermost ply running with the length of the board; one edge marginal portion of the board having a part including the base ply, said part having faces parallel with the general plane of the board, and a strip wedge running with the board and having a thin portion nearly midway between the exposed plies and having a flat engagement face secured to the board in the plane of one of said parallel faces and a substantially opposed curved engagement face secured to the outermost ply and to the intermediate ply, said intermediate ply tapering to a feather edge at the juncture of the outermost ply and the wedge, the wedge thickness between said engagement faces increasing at a progressively greater rate toward the edge of said outermost ply flaring same from the plane of the base ply, said wedge being provided with a rabbet groove having a face terminating at one of the parallel faces, to provide a space for an adjoining sheet when the latter is in engagement with the instant sheet.

4. A siding sheet comprising a board of five-ply wood, the two exposed plies and the middle ply having grain in the direction of the length of the board; one edge marginal portion of the board having a tongue including one of the exposed plies and the other edge marginal portion having a lap portion including the other exposed ply, the lap portion having opposite substantially parallel faces, and a strip wedge running with the board at said other portion and having a thin edge portion approximately merging with the middle ply and having a flat engagement face secured to the board in the plane of one of said parallel faces and a substantially opposed curved engagement face secured to the ply of said tongue and to the ply intermediate same and the middle ply, such intermediate ply tapering to a feather edge at the juncture of said ply of the tongue and the wedge, the wedge thickness between said engagement faces increasing at a progressively greater rate toward the edge of said ply of the tongue to flare same and increase the effective thickness of the sheet near said lap portion to provide a shadow-line.

5. A covering piece comprising a board of five-ply wood, the two exposed plies and the middle ply having grain in the direction of the length of the board; one edge marginal portion of the board having a tongue including one of the exposed plies and the other edge marginal portion having a lap portion including the other exposed ply, the lap portion having opposite substantially parallel faces, and a wedge in the form of a strip running with the board at said other portion and having a flat engagement face secured to the board remote from the edge of the lap portion and in the plane of one of said parallel faces and a substantially opposed curved engagement face secured to the ply of said tongue and to the ply intermediate same and the middle ply, such intermediate ply tapering to a feather edge at the juncture of said ply of the tongue and the wedge, the wedge thickness between said engagement faces increasing at a progressively greater rate toward the edge of said ply of the tongue to flare same, said wedge being provided with a rabbet groove to provide a space for the tongue of an adjoining similar covering piece when the latter is in engagement with said lap portion.

References Cited in the file of this patent

UNITED STATES PATENTS

| | | |
|---|---|---|
| 1,285,458 | Strunk | Nov. 19, 1918 |
| 2,428,325 | Collins | Sept. 30, 1947 |
| 2,636,226 | Holland | Apr. 28, 1953 |
| 2,648,103 | Wahlfeld | Aug. 11, 1953 |
| 2,664,835 | Sorensen | Jan. 5, 1954 |

FOREIGN PATENTS

| | | |
|---|---|---|
| 63,687 | France | Apr. 20, 1955 |
| 636,334 | Germany | Oct. 7, 1936 |